L. STEELMAN.
GLASS MACHINE.
APPLICATION FILED JUNE 25, 1910.

1,078,965.

Patented Nov. 18, 1913.

5 SHEETS—SHEET 1.

Witnesses

Lewis Steelman, Inventor by C.A.Snow & Co.

Attorneys

L. STEELMAN.
GLASS MACHINE.
APPLICATION FILED JUNE 25, 1910.

1,078,965.

Patented Nov. 18, 1913.

5 SHEETS—SHEET 3.

Witnesses

Lewis Steelman, Inventor by Attorneys

L. STEELMAN.
GLASS MACHINE.
APPLICATION FILED JUNE 25, 1910.
1,078,965.
Patented Nov. 18, 1913.
5 SHEETS—SHEET 4.
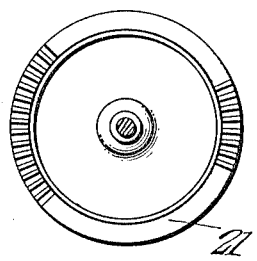
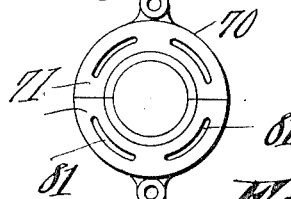
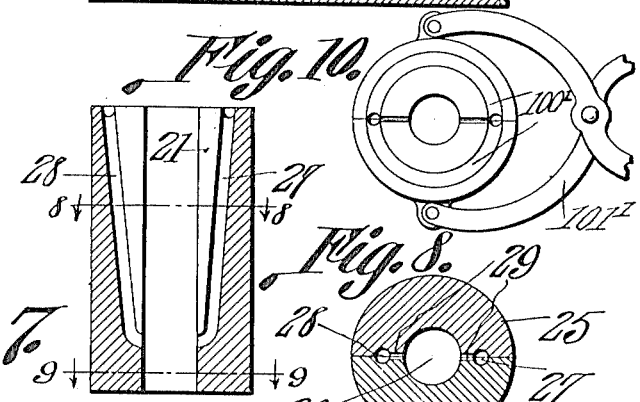
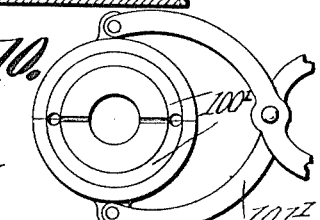
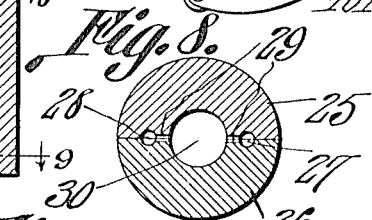
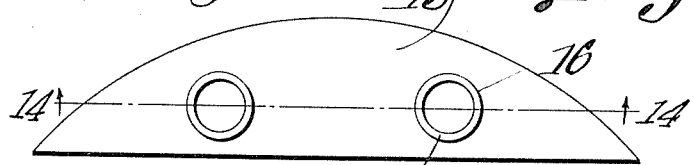
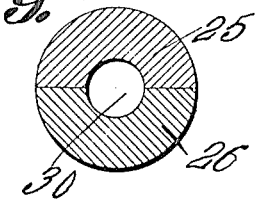
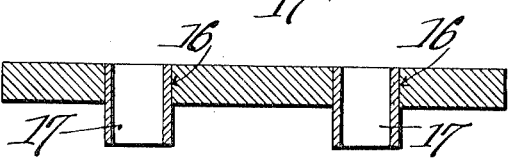
Witnesses
Lewis Steelman, Inventor
by C. A. Snow & Co.
Attorneys

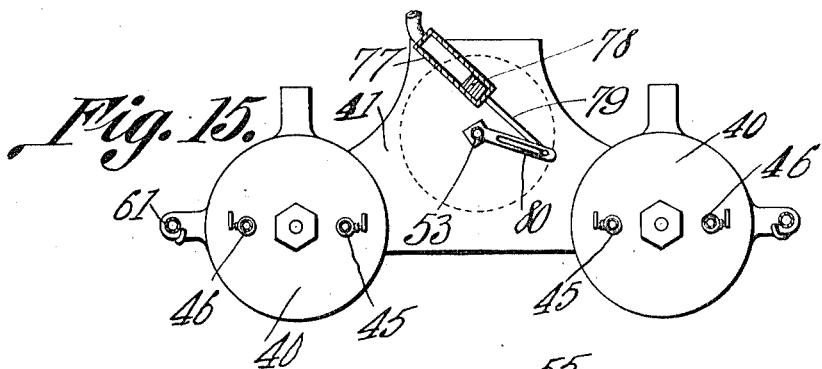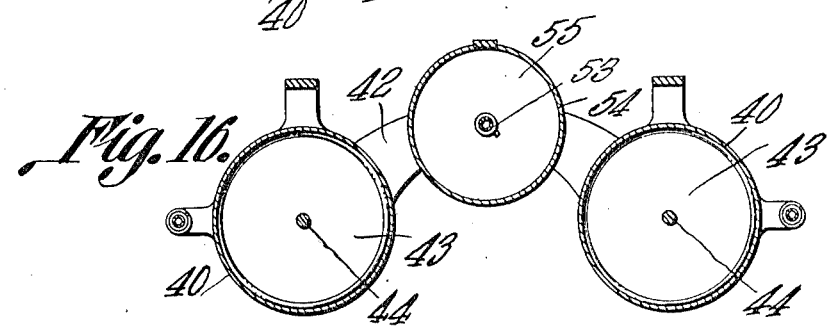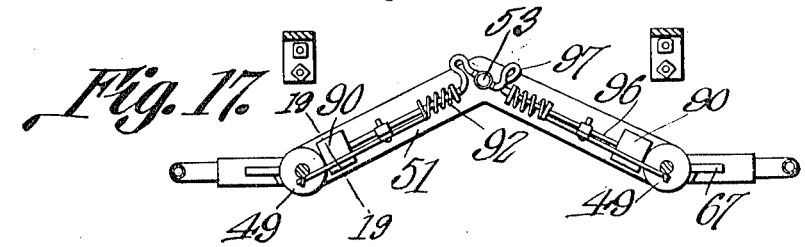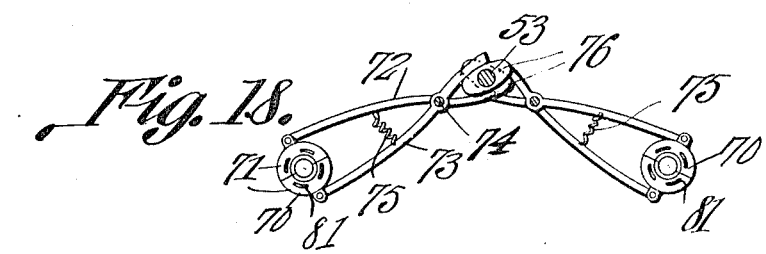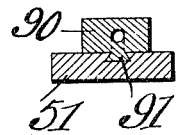

UNITED STATES PATENT OFFICE.

LEWIS STEELMAN, OF MILLVILLE, NEW JERSEY, ASSIGNOR OF ONE-HALF TO T. C. WHEATON CO., OF MILLVILLE, NEW JERSEY.

GLASS-MACHINE.

1,078,965.   Specification of Letters Patent.   Patented Nov. 18, 1913.

Application filed June 25, 1910.   Serial No. 568,881.

*To all whom it may concern:*

Be it known that I, LEWIS STEELMAN, a citizen of the United States, residing at Millville, in the county of Cumberland and State of New Jersey, have invented a new and useful Glass-Machine, of which the following is a specification.

This invention relates to glass machines such as are intended particularly for use in manufacturing bottles and the like.

The principal object of the invention is to provide a glass machine which is capable of producing two or more bottles at the same time.

Further objects of the invention are to improve, simplify and strengthen the construction of such machines, as well as to increase their automatic facility and to decrease the expense attending their manufacture, maintenance and use.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

Figure 1:
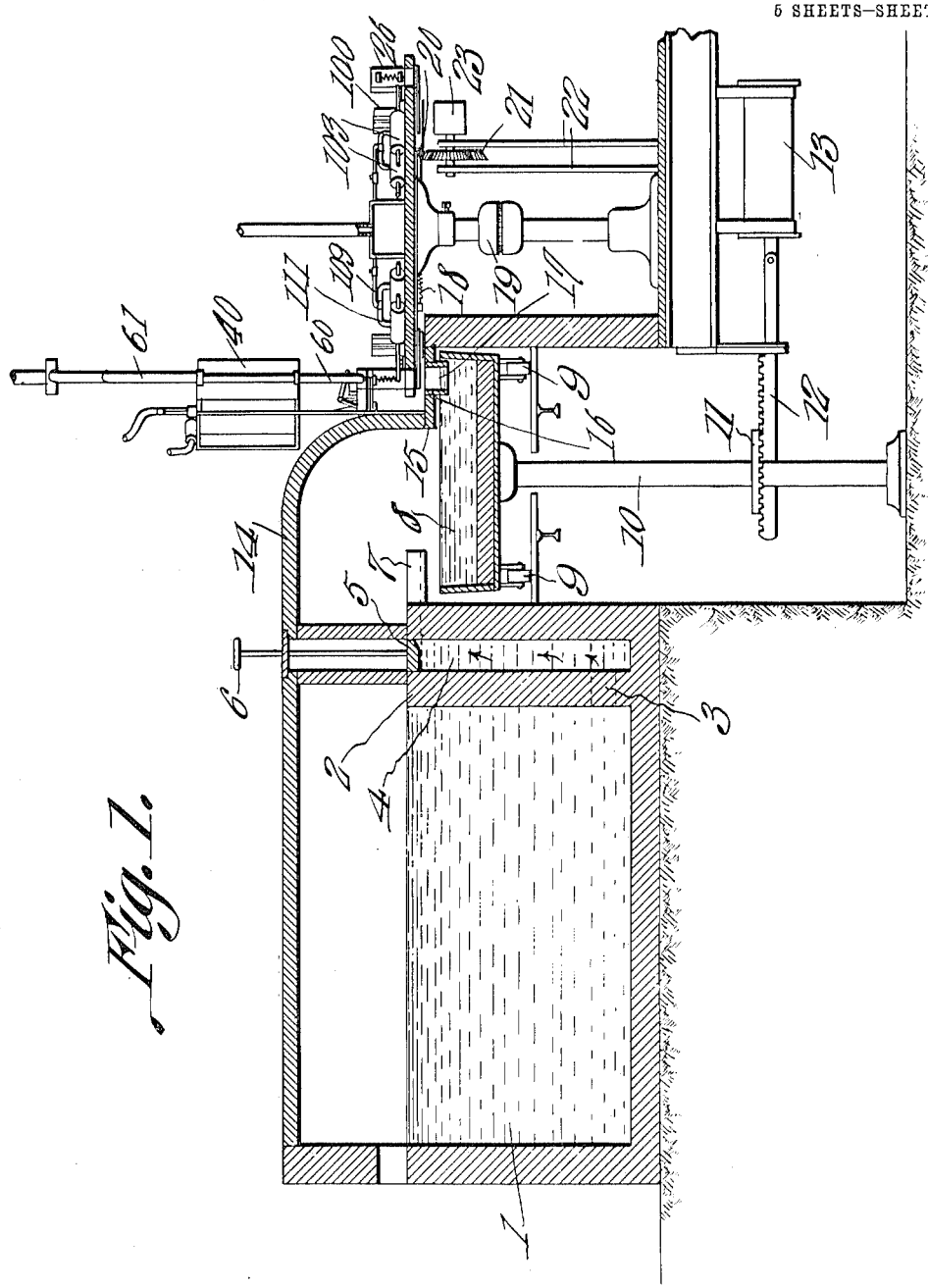
Figure 2:
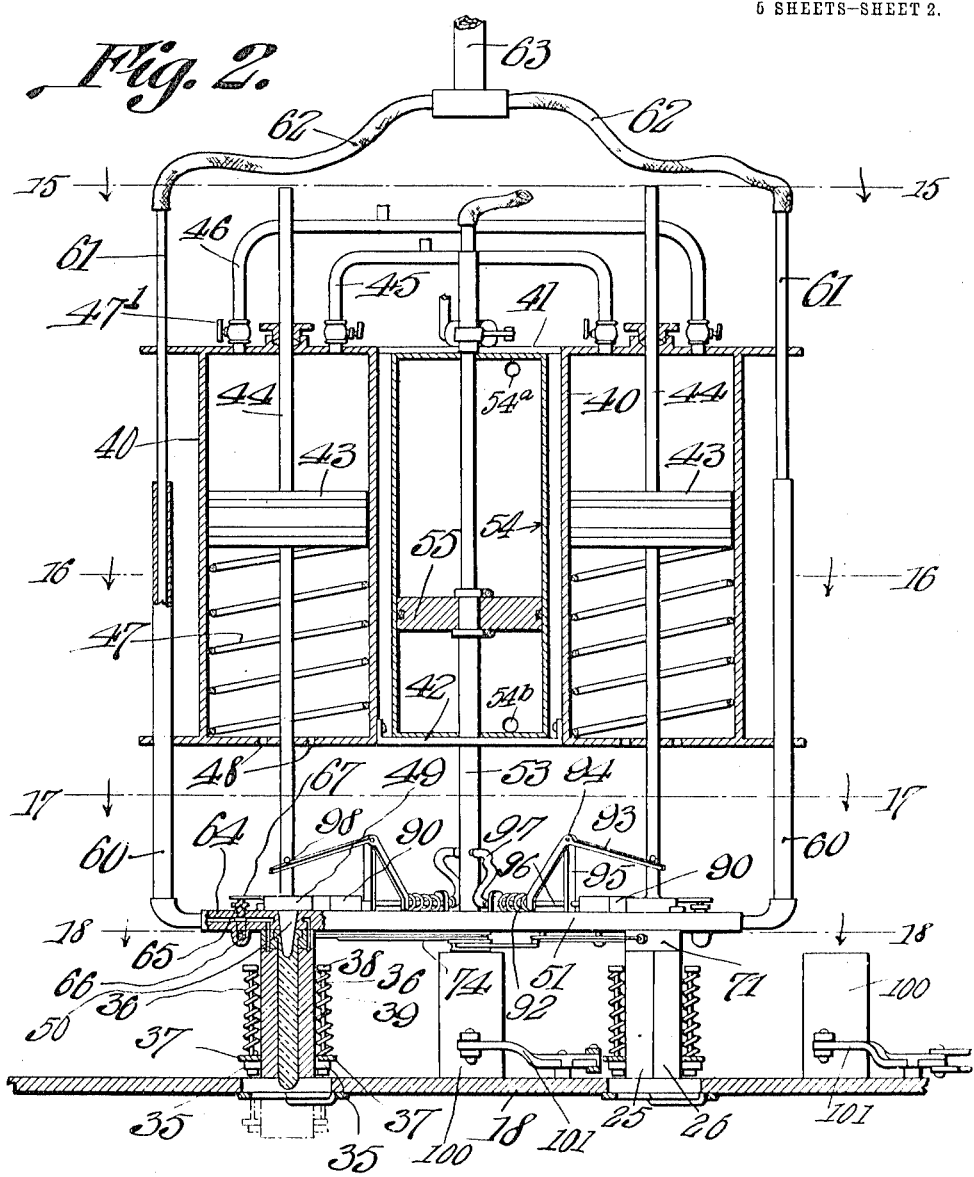
Figure 3:
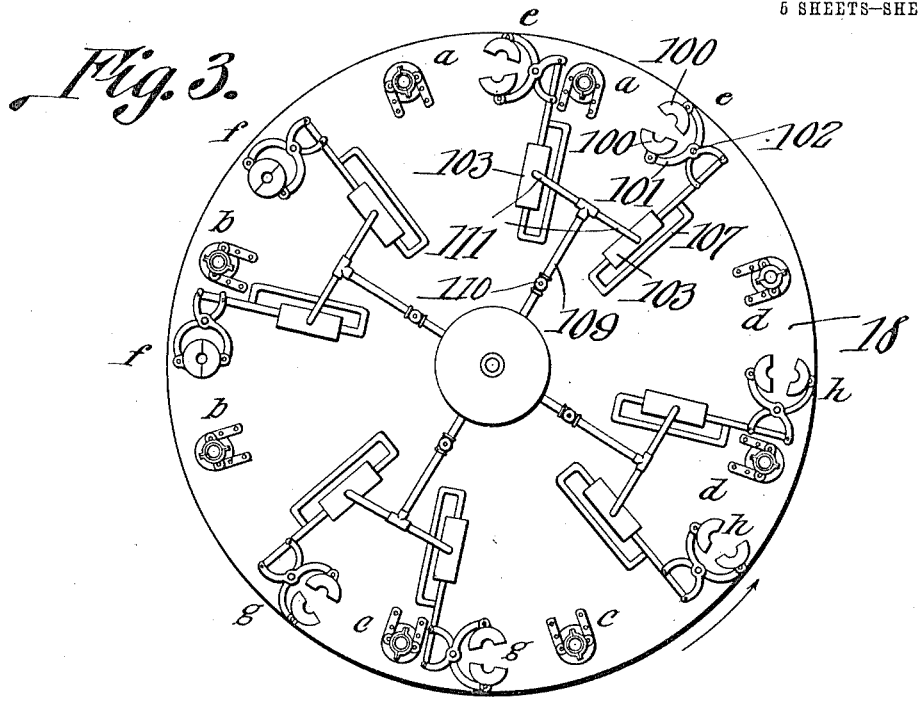
Figure 4:
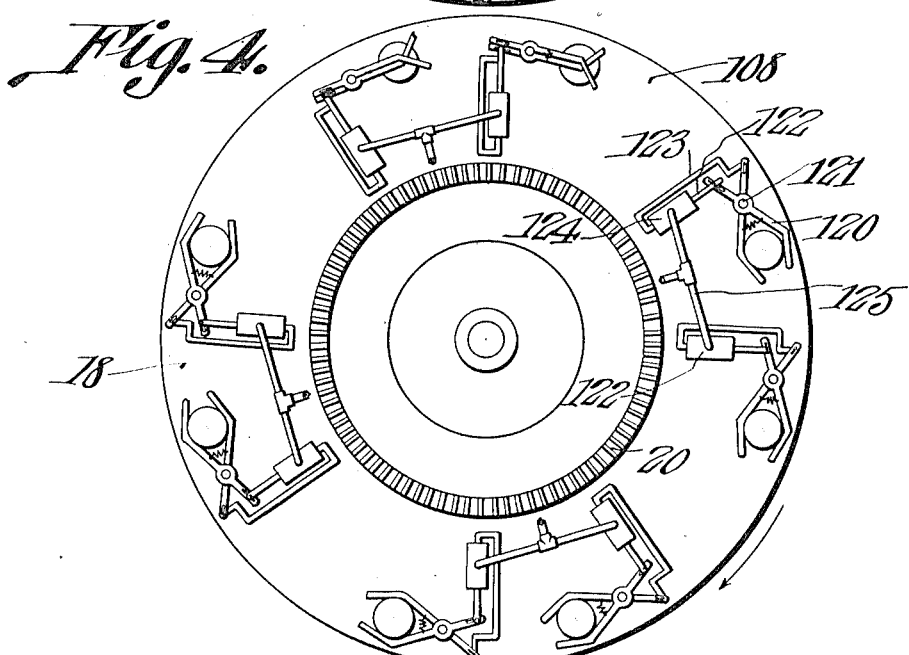

In the accompanying drawings forming part of this specification:—Figure 1 is a longitudinal vertical section through the glass tank, semi-rotatable pot, and bottle forming mechanism. Fig. 2 is a front elevation, at a right angle to Fig. 1, showing the forming mechanism for producing a plurality of bottles at the same time, the embodiment of invention illustrated being adapted to produce two bottles certain parts of the mechanism being shown in section. Fig. 3 is a plan view of the rotary table showing the blank molds into which the glass is sucked, the finishing molds, together with the pneumatic means for opening and closing the same, and a centrally disposed compressed air reservoir. Fig. 4 is an under plan view of the table shown in Fig. 3, illustrating particularly the knives for severing the glass metal, and the pairs of operating cylinders for controlling the cut-off knives. Fig. 5 is a detail view of the interrupted gear for intermittently rotating the table. Fig. 6 is a detail view of the neck ring. Fig. 7 is a vertical section through one of the blank molds into which the glass is primarily sucked. Fig. 8 is a section on the line 8—8 of Fig. 7. Fig. 9 is a section on the line 9—9 of Fig. 7. Fig. 10 is a detail view of a modified form of blank mold which is adapted to be opened in the same manner as the finishing mold. Fig. 11 is a view similar to Fig. 10 showing the pneumatic means for operating or opening the modified form of blank mold. Fig. 12 is a longitudinal section through one of the pneumatic devices for controlling the opening and closing of the finishing molds. Fig. 13 is an under plan view of a stone table with clay rings mounted above the semi-rotatable pots, the function of the rings being to project into the glass metal so as to prevent impure glass on the surface thereof from being sucked into the blank. Fig. 14 is a section on the line 14—14 of Fig. 13. Fig. 15 is a plan view partly in section, of the construction illustrated in Fig. 2, said section being taken on the line 15—15, Fig. 2. Fig. 16 is a transverse section on the line 16—16 of Fig. 2. Fig. 17 is a similar section on the line 17—17 of Fig. 2. Fig. 18 is a detail view on the line 18—18 of Fig. 2 showing the devices located below the rotatable table for opening the mold rings. Fig. 19 is a section on the line 19—19 of Fig. 17. Fig. 20 is a detail side elevation of one of the depressible blank molds, showing the springs for raising it after it has been depressed.

Like reference numerals indicate corresponding parts in the different figures of the drawing.

Briefly outlined, the apparatus of the present invention includes, among other things, a movable or semi-rotatable glass pot over which is disposed a stone slab having two circular openings therein with clay rings depending therefrom into the body of molten glass, the function of the rings being to prevent any surface scum from being sucked into the blanks; a movable element or rotary table having thereon a plurality of sets or pairs of blank molds and a plurality of sets or pairs of finishing molds, said blank and finishing molds being alternately arranged so that each finishing mold is located between two blank molds, and each blank mold between two finishing molds, the object being to permit two batches of glass to be simultaneously sucked into two of the blank molds and then by holding said batches of glass stationary and rotating the table one step, to bring two finishing molds into position to receive said batches of glass while they are being blown into bottles; a set of knives or cutters arranged on the under side of the table below each blank mold or batch forming device, said sets of knives being connected in pairs so that two sets of knives can be simultaneously operated to cut off two batches of metal; a vertically movable frame mounted above one edge of the table and directly over the stone slab and glass pot, so that each part of the periphery of the table can be successively brought into position beneath said vertically movable frame; a pair of neck rings carried by said vertically movable frame and provided with suitable means for opening and closing the same, said neck rings being adapted to be moved downward into engagement with the pair of blank molds temporarily arranged there-beneath so as to force said blank molds downward into the molten glass and suck up two batches thereof; means for raising said frame and said neck rings with the batches of glass suspended therefrom, out of engagement with said blank molds and for subsequently moving them downward into engagement with the pair of finishing molds which have been moved into position under the frame at the same time that the blank molds were moved out of position; means for moving blow-heads, mounted on said frame, into position above said mold rings, and blowing the batches of glass into bottles; means for rotating the table another step, and means for opening the finishing molds to permit the removal of the formed bottles.

Referring to Fig. 1 of the drawings the numeral 1 indicates the glass tank; 2 the bridge wall; 3 the opening below said wall; 4 the passage for the molten glass; 5 the valve controlled by the handle 6, for regulating the flow of the glass; 7 the spout from which the glass discharges; 8 a semi-rotatable glass pot supported on rollers 9 and operated by a shaft 10 having thereon a pinion or gear wheel 11 which is engaged by a rack bar 12; and 13 a cylinder for reciprocating the rack bar 12 so as to impart a semi-rotation to the pot 8.

The semi-rotatable pot 8 is covered by a casing 14 which serves to retain the heat of the glass and to prevent foreign substances from falling thereinto. Above that portion of the pot 8 from which the glass is to be withdrawn, is mounted a stone shelf or cover plate 15, the shape and details of which are best shown in Figs. 13 and 14 of the drawing. The stone cover plate 15 is formed with a pair of circular openings 16 into which are fitted rings 17 formed of clay or other suitable material, the rings 17 being of such length as to project at their lower ends, below the surface of the molten glass in the pot 8, as shown clearly in Fig. 1 of the drawings. It is to be understood that two of the openings 16 and rings 17 are shown in the cover plate 15 for the reason that the embodiment of invention illustrated is intended to form two bottles at the same time. If it be desired to arrange the machine in such manner as to produce three bottles at the same time, then three openings will be formed in the cover plate 15. It is to be understood, therefore, that the machine can be arranged in such manner as to manufacture a larger number of bottles than two, at the same time, without departing from the spirit of the invention.

The advantages derived from the use of the semi-rotatable pot 8 and the rings 17 is that the backward and forward movement of the pot 8 accomplishes the same result as the rotatable pot without causing such a marked collection of seed, cord or irritation at the periphery of the molten glass as in the rotary pot. The rings 17 serve to prevent the extreme surface glass from being drawn into the blank molds for use in the making of bottles, and consequently a superior grade of article is produced.

The rotary table 18, shown in Figs. 3 and 4 of the drawings, which carries the pairs of blank and finishing molds, is mounted upon a suitable ball bearing support 19 shown in Fig. 1 and is rotated in a step by step manner by means of a gear wheel 20 fixed on the lower surface of the table 18 as shown in Fig. 4, and a gear wheel 21 having interrupted sets of gear teeth as shown in Fig. 5, the gear wheel 21 being journaled on supports 22 shown in Fig. 1 and being operated by means such as the belt wheel 23. The rotation of the belt wheel 23 causes the table 18 to rotate in a step by step manner. The table 18, as best shown in Fig. 3, has mounted on the upper surface thereof, and adapted to be forced downward through suitable openings therein, pairs of blank molds a—a, b—b, c—c, d—d. Each of the blank molds shown in Fig. 3 is constructed preferably as illustrated in detail in Figs. 7, 8 and 9 of the drawings. That is to say, each blank mold is formed in two halves 25 and 26 suitably joined together and formed with converging suction passages 27 and 28, half in one part of the blank and half in the other part, a radially extending slot 29 being formed at each side of the central opening 30 in the blank mold so that the effect of the suction will be felt upward from the lower ends of the suction passages 27 and 28 to the upper end of the blank mold. It is to be understood that after a suitable neck ring connected with a suction pipe has been automatically fed downward onto the upper end of each blank mold, said mold is forced downward through the table 18 and clay rings 17 of the cover plate 15 into contact with the glass in the tank 8, a batch of glass being then sucked upward into the blank mold by the suction action of the neck ring through the passages 27 and 28 and slots 29, the batch of glass filling the inner portion 30 of the blank mold.

For the purpose of raising the blank molds after they have been pressed downward into contact with the molten glass, each of said molds is provided with a pair of oppositely extending ears or lugs 35 with which are rigidly connected upwardly extending rods 36 which pass through brackets 37 secured to the table 18 as shown in Figs. 2 and 20 and are provided at their upper ends with heads or enlargements 38, coil springs 39 being arranged around the rods 36 between the enlargements 38 and the brackets 37, the function of the springs 39 being to raise the blank molds filled with molten glass after the pressure by which they have been depressed is removed in the manner hereinafter described.

The means for depressing the two blank molds which are to receive batches of metal, sucking the metal into said molds, raising the neck rings with the metal batches suspended therefrom, out of engagement with the blank molds, lowering said batches into the finishing molds which have been moved thereunder, and blowing the bottles, will now be described. The reference numerals 40—40 in Fig. 2, indicate a pair of cylinders which are stationarily mounted above the table 18 in any suitable manner. The cylinders 40 are connected with each other in any suitable manner such as by means of the upper and lower frame pieces 41 and 42, and each of said cylinders is provided interiorly with a piston 43 which is guided in its movements within the cylinder by means of the piston rods 44. The two pistons 43 are lowered or depressed by means of compressed air which is fed to and exhausted from the upper end of each of the cylinders 40 by means of the air pipes 45, 46, controlled by the valves 47′. Each of the pistons 43 is raised, when the air pressure is removed from the upper face thereof, by means such as the coil spring 47 arranged in the lower end of the cylinder, exhaust vents 48 being formed in the lower end of each cylinder to permit the free operation of the piston 43 on the downward movement thereof. Secured to the lower end of each piston rod 44 is a core or plunger head 49 and a core 50 which is intended to produce the initial blow-hole in the glass blank. The two plunger heads 49 are adapted to contact with the upper surface of a vertically movable cross head 51, the core 50 being adapted to extend downward through a suitable opening in the cross piece 51 as shown in section at the left end of Fig. 2. The cross head 51 is fed downward by means of a centrally disposed hollow piston rod 53 which extends through a stationary cylinder 54 and has fixed thereon a piston 55. The cross piece 51 is likewise raised by the piston in cylinder 54, pressure being admitted above the piston 55 as at 54$^a$ when it is desired to feed the cross head 51 downward, and pressure being admitted below said piston as at 54$^b$ when it is desired to feed the cross piece 51 upward. The hollow piston rod 53 is used as a conductor for the air which is used to blow the bottle and is also adapted for partial rotation for the purpose of opening the neck rings as will more fully hereinafter appear. Connected with the outer ends of the cross piece 51 are upwardly extending suction pipes 60—60 which are telescoped with suction pipes 61—61, that are stationary with relation to the cylinders 40 and have connected at their upper ends rubber suction pipes 62 connecting with a common suction pipe 63. The movable suction pipe sections 60—60 at their lower ends communicate with suction passages 64 formed in the ends of the cross piece 51 and controlled by vertically movable cut-off valves 65 having springs 66 for forcing them upward into closed position, and being adapted to be opened against the pressure of the spring 66 by means of transverse arms 67 connected with the plunger head 49, the construction being such that when the plunger head 49 is lowered into engagement with the cross piece 51 the transverse arm 67 opens the valve 65 and permits the operation of the suction for drawing molten glass upward into the blank, and when the plunger head 49 is raised out of engagement with the cross head 51, the valve 65 automatically closes and shuts off the suction.

The two neck rings 70—70 shown in Fig. 18 of the drawings, are formed in two halves or sections 71—71 mounted on crossed arms. 72—73 pivotally mounted at 74 on the lower faces of the cross piece 51. The neck rings 70 are closed by means of coil springs 75 and are opened by means of oval shaped members 76 fixed on the rotary piston rod 53 of the cylinder 54. The two oval shaped opening members 76 are arranged at the proper angle with respect to each other as shown in Fig. 18.

The means for rotating the piston rod 53 to open the neck rings 70 is best shown in Figs. 2 and 15 of the drawings and consists preferably of a cylinder 77 having therein a piston 78 connected with a piston rod 79 which is attached to an arm 80 fixed on the piston rod 53 adjacent the upper end thereof. When the operator desires to open the neck rings, he turns any suitable valve, not shown, and thus admits pressure to the cylinder 77 so that the arm 80 is thrown into the position shown in Fig. 15, thus rotating the piston rod or shaft 53 in opening the neck ring. Upon releasing the pressure in the cylinder 77, the coil spring 75 shown in Fig. 18 returns the mold rings to closed position. The neck rings 70 are formed with suction passages 81 as shown in Fig. 18 which register at their upper ends with the suction passages 64 and at their lower ends with the suction passages 27 and 28, Figs. 7 and 8, in the blank molds 26.

It will be obvious, that after two blank molds have been moved into position beneath the cross piece 51 in Fig. 2, the operator of the machine by manipulating the valve controlling the cylinder 54 can lower the cross piece 51 onto the blank mold with the neck rings 70 fitting on the upper end thereof, and can force said blank molds downward against the tension of the coil springs 39 into engagement with the molten glass. By then manipulating the valves of the cylinders 40 he can lower the plunger head 49 into engagement with the upper surface of the cross piece 51, thus moving the core 50 into position to form the initial blow-hole in the glass, and at the same time causing the transverse arm 67 to automatically open the suction passages 64 so as to produce a suction through the neck ring and in the blank mold so as to suck up a batch of glass as shown in section at the left end of Fig. 2. By then manipulating the cylinder 54 to raise the cross piece 51, said cross piece together with the neck rings and the glass batches hanging thereon will be drawn upward out of engagement with the blank molds 26 and will permit the table 18 to rotate so as to move the two blank molds out of alinement with the glass batches, after which the cross piece can be lowered so as to feed the batches into position in the finishing mold so as to proceed with the blowing operation as will more fully hereinafter appear.

The blow-heads are indicated by the reference numerals 90—90 in Figs. 2, 17 and 19 of the drawing, and are mounted for sliding movement in opposite directions upon the cross piece 51, each of said blowheads 90, as shown in Fig. 19, being provided with a downwardly extending dove-tailed portion 91 which is fitted tightly into a dove-tail groove formed in the cross piece 51 and slides therein under the combined action of a coil spring 92 and a bell crank lever 93 fulcrumed at 94 upon an upstanding arm or bracket 95 connected with the cross piece 51. The supply pipe 96 of the blow-head is connected by means of a flexible pipe 97 with the hollow piston rod 53 so as to get its supply of air therefrom. When the plunger head 49 is lowered in the position shown in Fig. 2, a pin 98 on the piston rod 44 engages the bell crank lever 93 and depresses the outer end thereof so as to cause the inner end thereof to retract the blow-head 90 out of the way of the plunger head 49 and when said plunger head 49 is raised above the cross piece 51, said head strikes the bell crank lever 93 and permits the coil spring 92 to throw the blow-head into position on the cross piece 51 above the neck ring 70. When the blow-head 90 is retracted in the position shown in Figs. 2 and 17, the blow vent thereof is closed by the undercut groove in which the blow-head slides, but when said blow-head is moved into position above the neck ring, the blow pressure escapes through the ring and into the glass article to be blown.

The molds into which the articles are to be blown, are equidistant from the center of the table and are arranged on the table 18 in pairs as shown in Fig. 3, as indicated by the reference letters $e$—$e$, $f$—$f$, $g$—$g$, and $h$—$h$. Each mold consists of two halves, 100—100 each mounted on an arm 101, fulcrumed at 102 and operated by means of a piston cylinder 103 the interior arrangement of which is best shown in Fig. 12. Each piston cylinder 103 has therein a pair of oppositely movable pistons 104 each having a piston rod 105 and a coil spring 106. The coil springs 106 serve to move the pistons 104 toward the center of the cylinder, and air pressure admitted to the middle of the cylinder serves to operate said piston. The inner piston rod 105 of each cylinder is extended around the cylinder as indicated at 107, and is connected with one of the mold arms, the other piston rod being connected with the other mold arm. The action of the coil springs 106 is to close the mold, and the action of air pressure admitted to the middle of the cylinder 103 is to open the mold. Each pair of cylinders 103 has a common air supply pipe 109 controlled by a valve 110 and having a cross piece 111 connecting with the two cylinders. By opening the valve 110 and admitting pressure to the two cylinders 103, the two molds are simultaneously opened and by turning the valve 110 which is a three-way valve, to another position, the air pressure is cut off and the air in the cylinder is exhausted through the valve when the coil springs 106 close the mold sections 100. It is to be noted from Fig. 3 that the table 18 rotates in the direction of the arrow and that the jaws of the mold when in open position are directed in the direction of movement of the table. This is to permit the mold sections 100 to clear the lower ends of the glass batches when the molds are moved into position beneath said batches As a modification of the invention, the constantly closed blank molds shown in Figs.

7 and 8 of the drawings, may be constructed so as to be opened and closed by the operator in the same manner as the mold, as shown in Figs. 10 and 11 of the drawing. That is to say, twin pistons may be arranged in a cylinder 103', these pistons being employed for opening the blank molds 100' by means of arms 101', and coiled springs may be employed for closing the molds in the same manner as disclosed in Fig. 12 with reference to the mechanism for actuating the molds 100.

The means for cutting off the batches of glass after they have been sucked up into the blanks, is best shown in Fig. 4 of the drawings, and consists of a plurality of pairs or sets of knives 120 fulcrumed at 121 on the lower surface of the table, each pair of knives being arranged adjacent one of the openings through which the blank is forced downward into the glass metal. The knives 121 are connected with piston rods 122 and 123 of a cylinder 124 constructed the same as that shown in Fig. 12, the two cylinders 124 of each pair being connected by a common supply pipe 125 by means of which they may be simultaneously controlled.

Constructed as described, the operation of the entire machine is as follows: The table 18 is rotated so as to bring the blank molds a—a in Fig. 3 directly beneath the cross head 51 in Fig. 2. By manipulating the cylinder 54 to lower the cross head 51 the neck rings 71 become seated on the upper ends of the blank molds 26 and force them downward through the openings in the table and through the clay rings 17 into engagement with the glass. While this is being done, the plungers 49 may be raised a slight distance above the cross head 51 so as not to waste any suction force until the glass metal is reached. By then lowering the head 49 into engagement with the cross piece 51, the transverse arms 67 open the valves 65 so as to permit the suction through the passages 64 and through the mold rings and blank molds to suck the glass metal upward into the blank molds, the cores 50 serving to produce the initial blow-hole in the glass batch. The cross piece 51 is then raised to its highest position, thus causing the neck rings with the glass batches suspended therefrom, to move upward out of engagement with the blank molds 26. The table 18 then rotates one step so as to move the blank molds a—a in Fig. 3 out from under the cross piece 51 and to bring the molds e—e into position beneath the neck rings 71. At the same time that the open molds e—e are moving into position beneath the cross piece 51, said cross piece 51 is being moved downward by the operator so as to feed the glass batches into the mold. The operator then manipulates the valve 110 in Fig. 3 to close the mold and at the same time manipulates the cylinders 40 to raise the plunger heads 49 so as to cause them to contact with the angle levers 93 and thus permit the blow-heads to slide over beneath the plunger heads 49 and blow downward through the neck ring so as to form the bottle. The operator then manipulates the cylinder 77 in Fig. 15 so as to open the neck rings 71 in Fig. 18 by slightly rotating the shaft 53. The cross piece 51 is then raised far enough for the neck rings to clear the upper ends of the bottles and the table 18 is rotated one step so as to take the finished bottles out of position beneath the cross piece and at the same time feed two more blank molds into position beneath the cross piece so as to receive the new batches. The two bottles which have been formed are permitted to remain in the molds for one or two steps of the table so as to enable them to anneal, after which the molds are opened and the bottles are removed. It will be understood that after the glass metal has been sucked up into the blanks in the manner described, the operator manipulates the valves of the twin cylinders 124 in Fig. 4 so as to cause the knives 120 to cut the metal below the table.

The machine of the present invention constitutes an important advance in the art as it is adapted to form a plurality of bottles at the same time. Moreover, a single set of neck rings and blow-heads coöperate successively with all of the blank and finishing molds during the operation of the machine.

What is claimed is:—

1. A glass machine having a movable pot, a movable table, a pair of hollow depending members projecting below the surface of the glass metal in the pot, a plurality of pairs of blank molds mounted on the table and adapted to be depressed through said hollow depending members in the glass metal, means for simultaneously sucking gathers of glass into two of said blank molds, means for cutting off the gathers of glass at the lower ends of the blank molds, finishing molds, means for transferring the gathers of glass from the blank to a pair of finishing molds, means for blowing said gathers in said finishing molds, and means for simultaneously opening a pair of finishing molds to permit the completed articles to be removed therefrom.

2. A glass machine including a revoluble table, a series of blank molds thereon, a series of finishing molds upon the table, each finishing mold being interposed between two blank molds, and means for simultaneously filling two of the blank molds, simultaneously drawing the batches from said filled molds, simultaneously depositing the batches in the finishing molds, and simultaneously closing the finishing molds upon the batches.

3. A glass machine including a revoluble table, a series of blank molds thereon, a series of finishing molds upon the table, each finishing mold being interposed between two blank molds, and means for simultaneously filling two of the blank molds, simultaneously drawing the batches from said filled molds, simultaneously depositing the batches in the finishing molds, and simultaneously closing the finishing molds upon the batches, all of said molds being equidistant from the axis of rotation of the table.

4. A glass machine including an outlet ring, a table, means for intermittently rotating the same, a yieldingly supported mold movable with the table and to a position of rest over the ring, there being opposed suction passages within the mold and extending longitudinally therein, and means for depressing the mold, while at rest, against the action of its supporting means and into the ring, creating a suction through the passages, and then releasing the mold supporting means to raise the mold.

5. A glass machine including a rotary table, means for intermittently operating it, a yieldingly supported blank mold upon and movable with the table, a yieldingly supported core, means for lowering the core into the mold, a cross head, a pressure operated piston for lowering and raising the cross head to lower and release the mold, a hollow rod extending from the piston, means for directing air under pressure into the rod, means for directing air from the rod to the flow hole formed by the core, means for creating a suction through the mold and into the cross head, a neck ring movable with the cross head, means for rotating the rod, and means operated by the rod when rotated for actuating the ring.

6. In a glass machine, a rotary table, means for intermittently rotating it, a yieldingly supported blank mold upon and movable with the table, a cross head, a pressure operated piston for lowering and raising the cross head to lower and release the mold, a rod extending from the piston, means for creating a suction through the mold and into the cross head, a neck ring movable with the cross head, means for rotating the rod, and means operated by the rod when rotated for opening the neck ring.

7. A glass machine including a rotary table, means for intermittently operating it, a yieldingly supported blank mold upon and movable with the table, and having opposed suction passages opening thereinto, a cross head, pressure operated means for lowering and raising the cross head to lower and raise the mold, said means including a piston rod, there being suction openings in the cross head and movable into register with the passages in the mold, a sectional neck ring movably connected to the cross head and movable upon the mold, said ring having suction openings adapted to register with the passages in the mold and the openings in the cross head, means for rotating the rod, means operated by the rod when rotated for opening the ring, and means for creating a suction through the passages and registering openings when the mold is pressed.

8. A glass machine including a rotary table, a yieldingly supported blank mold upon and movable with the table, said mold having opposed suction passages opening thereinto, a cross head, pressure operated means for lowering and raising the cross head to lower and raise the mold, said means including a piston rod, there being a suction opening in the cross head and movable into register with the passages in the mold, a neck ring movably connected to cross head and movable onto the mold, means for rotating the rod, means operated by the rod when rotated for opening the neck ring, a suction tube, and means under the control of the cross head for successively establishing and closing communication between said tube and the openings and passages when the cross head is lowered and raised respectively.

9. A glass machine including a rotary table, means for operating the same, a blank mold and a finishing mold movable with the table, a cross head, a plunger head movable against the cross head, means for filling the blank mold, a core movable into said blank mold, a slidable combined blow head and air cut-off, means for shifting the same out of active position when the plunger head is in place upon the cross head, means for automatically shifting the blow head into active position when the plunger head and core are raised, for directing a batch of glass from the blank mold to the finishing mold, and means for successively closing and opening the finishing mold.

10. A glass machine including a movable table, a yieldingly supported blank mold carried thereby and having opposed air passages therein communicating throughout their lengths with the interior of the blank molds, suction mechanism, and a sectional neck ring carried thereby and having air passages therein movable into register with the air passages in the blank mold, said neck ring being movable against the blank mold to depress it during the suction of air through the passages.

In testimony that I claim the foregoing as my own, I have hereto affixed my signature in the presence of two witnesses.

LEWIS STEELMAN.

Witnesses:
George W. Branin,
Albert J. Smith.